United States Patent
Zabari

(10) Patent No.: US 11,045,829 B2
(45) Date of Patent: Jun. 29, 2021

(54) SELF-SEALING SHOWER HEAD WITH DISINFECTANT

(71) Applicant: Lidor Zabari, Bat Yam (IL)

(72) Inventor: Lidor Zabari, Bat Yam (IL)

(*) Notice: Subject to any disclaimer, the term of this patent is extended or adjusted under 35 U.S.C. 154(b) by 35 days.

(21) Appl. No.: 16/447,994

(22) Filed: Jun. 21, 2019

(65) Prior Publication Data

US 2019/0344301 A1 Nov. 14, 2019

Related U.S. Application Data

(63) Continuation-in-part of application No. PCT/IL2017/051279, filed on Nov. 23, 2017.

(30) Foreign Application Priority Data

Dec. 21, 2016 (IL) .......................................... 249680

(51) Int. Cl.
| | |
|---|---|
| *B05B 15/00* | (2018.01) |
| *B05B 15/50* | (2018.01) |
| *B05B 15/55* | (2018.01) |
| *B05B 1/18* | (2006.01) |

(52) U.S. Cl.
CPC ............... *B05B 15/50* (2018.02); *B05B 1/18* (2013.01); *B05B 15/55* (2018.02)

(58) Field of Classification Search
CPC ............ B05B 1/18; B05B 1/185; F16K 15/00
USPC .................................. 239/436–449, 548–568
See application file for complete search history.

(56) References Cited

U.S. PATENT DOCUMENTS

| | | | | |
|---|---|---|---|---|
| 623,128 | A * | 4/1899 | Bartlett | F16K 15/205 |
| | | | | 251/349 |
| 1,236,617 | A * | 8/1917 | Speakman | B05B 15/5225 |
| | | | | 239/118 |
| 2,659,627 | A * | 11/1953 | McConnell | E03C 1/0465 |
| | | | | 239/316 |
| 3,788,553 | A | 1/1974 | Heckman | |
| 6,648,245 | B1 * | 11/2003 | Samwell | B05B 1/3073 |
| | | | | 239/525 |
| 7,566,885 | B2 * | 7/2009 | Helmore | A61L 2/10 |
| | | | | 210/739 |
| 9,079,204 | B1 | 7/2015 | Hattenbrun | |
| 9,486,817 | B2 * | 11/2016 | Patton | C02F 1/30 |
| 10,597,311 | B2 | 3/2020 | Mayrand | |
| 2010/0199421 | A1 * | 8/2010 | Moon | A23N 12/02 |
| | | | | 4/602 |

(Continued)

FOREIGN PATENT DOCUMENTS

| | | |
|---|---|---|
| CN | 105478259 | 4/2016 |
| DE | 3107808 | 9/1982 |

(Continued)

*Primary Examiner* — Viet Le
(74) *Attorney, Agent, or Firm* — Alphapatent Associates, Ltd; Daniel J. Swirsky

(57) ABSTRACT

A shower head for preventing bacteria formation in the shower head including multiple outlet nozzles each having a valve, where each of the valves is adapted to open when pressurized water flows into the shower head and to close when there is no pressurized water inflow such that residual water is held inside the shower head, a disinfectant means in fluid communication with the residual water, and means for preventing fluid communication of the disinfectant means with pressurized water flowing through the shower head.

18 Claims, 12 Drawing Sheets

(56) References Cited

U.S. PATENT DOCUMENTS

| | | | | |
|---|---|---|---|---|
| 2011/0150700 A1* | 6/2011 | LaPorta | ................... | B05B 1/18 |
| | | | | 422/33 |
| 2013/0177475 A1* | 7/2013 | Finch | ..................... | E03C 1/046 |
| | | | | 422/28 |
| 2014/0174487 A1 | 6/2014 | Laporta | | |
| 2015/0096596 A1* | 4/2015 | Dvorak | .................... | A61L 2/18 |
| | | | | 134/7 |
| 2017/0036222 A1 | 2/2017 | Lee | | |
| 2017/0320073 A1* | 11/2017 | Sunshine | ................ | B05B 15/50 |
| 2018/0099295 A1* | 4/2018 | Armbruster | ........... | B05B 15/528 |

FOREIGN PATENT DOCUMENTS

| | | |
|---|---|---|
| DE | 202013002258 | 3/2014 |
| DE | 102013108617 | 3/2015 |
| KR | 20150116611 | 10/2015 |
| KR | 20160018057 | 2/2016 |

\* cited by examiner

SELF-SEALING SHOWER HEAD WITH DISINFECTANT

CROSS-REFERENCE TO RELATED APPLICATIONS

This application is a Continuation-In-Part of International Application No. PCT/IL2017/051279, filed Nov. 23, 2017, which claims the benefit of priority from Israel Patent Application No. 249680, filed Dec. 21, 2016, which applications are incorporated herein by reference in their entirety.

FIELD

The present disclosure is of a shower head and in particular, such a shower head that prevents bacteria development within the shower head.

BACKGROUND

The start and stop of water flow through a shower head results in a mixing of air and water. When water flow is stopped through existing shower heads and faucets, air fills the space within the shower head. When water flow is renewed the new flow generates turbulence inside the empty shower head which generates a water aerosol. Further, the drying out of the shower head between uses, caused by the entry of air into the shower head, promotes the formation of limescale. The air, organic materials, water, aerosol, and limescale within the shower head provide an excellent environment for development of *Legionella* bacteria. This bacterium and others may pose a serious danger to at-risk populations especially in hospitals, military camps, hotels, sports centers, and senior citizen residences.

The danger posed by shower heads is in direct contrast to the need for hygiene that showers and fresh water are supposed to provide and there is therefore a need to keep water systems free of pathogens including *Legionella* bacteria.

Water disinfection chemicals and mechanisms rely on the presence of water and therefore do not function when there is no water in the shower system, particularly in the shower head when the water flow is stopped and the water drains from the head. Further, these systems function upstream from the shower head and are difficult to maintain. Manual disinfection, by submerging the shower head in a disinfectant solution is very time-consuming, and is therefore only performed periodically such that it is only effective for a short period resulting in enough time for bacteria to prosper between manual disinfection visits.

PCT/NL2000/000412 to Antonius Maria Van Remmen discloses an irradiating a liquid with ultraviolet radiation with a converter inside the housing. The ultraviolet disinfection does not change the environment within the outlet part of the shower head that is downstream from the light. Therefore this approach can't prevent *legionella* bacteria from prospering in the shower head.

US20110150700 to LaPorta and U.S. Pat. No. 2,659,627 to Mcconnell disclose shower heads which are complex, block the flow of water, require difficult maintenance provided by a technician, and also do not provide continuous disinfection in the actual head. Further, such shower heads do not prevent entry of air into the head, resulting in oxidation of any chlorine that is present thus rendering the chlorine less effective.

Current shower heads do not provide any mechanism to prevent slow leaks of water via a dripping shower head. This results in wastage of water.

There is therefore a need for improved shower heads and faucets that are simple to manufacture and maintain that prevents the head from becoming a fertile habitat for development of *Legionella* and other bacteria. It is further desirable that disinfection of the shower head should be continuous and easily achieved. It is further desirable that a shower head should prevent wastage of water.

SUMMARY

The present disclosure overcomes the deficiencies of the background art by providing a shower head that prevents or minimizes the mixing of air and water within the shower head, and also results in a shower head that is always filled with water, even when switched off thus preventing the environment that enables growth of bacteria in the shower head. Further, the "residual water" that remains inside the shower head when the water is turned off may be continually disinfected with an integrated disinfection means.

The nozzles of the shower head each comprise a valve that is forced open when a pressurized water flow is provided to the head and that close when the pressurized water flow is stopped. In some embodiments, the valve is formed from an elastomeric material that is pushed open by pressurized water and that reverts back to a closed state in the absence of pressurized water due to the properties of the elastomeric material. The valves close when pressurized water is shut off to prevent or minimize the entry of air into the head. Further, as water flow into the head is shut off and the water pressure decreases, the valves close with water still inside the head resulting in residual water—water that remains inside the shower head. This residual water also prevents or minimizes the inflow of air when the pressurized water flow is renewed and the valves open and also the resulting turbulence that generates water aerosols, to thereby greatly minimize or prevent formation of water aerosols.

The valves preventing air entry and the residual water also prevent or minimize buildup of limescale that provides a habitat for bacteria. The valves therefore provide multiple effects—prevention or minimizing of air entry, turbulence and aerosols, water/air mixture, and limescale, and creating residual water—thus preventing or minimizing the environment that enables growth of bacteria in the shower head.

Further, the shower head comprises a disinfectant means comprising one or more of a disinfectant material, ultraviolet (UV) light, microfilter, and/or electrolysis. The disinfectant is provided so as to be continually active in the residual water for disinfecting the residual water when water flow ceases and not active when water flows through the shower head. Use of the disinfectant means only in the residual water (and not in flowing water) results in a significant reduction in the amount of disinfectant means that is required (compared to disinfecting solutions that are active also in running water). Further, as above, the valves prevent entry of air thus preventing or minimizing oxidation of chlorine used for disinfection. Thus the valves increase the effectiveness of the disinfecting means.

Disinfectant material is provided in a chamber constructed with an opening into the internal region of the shower head that is closed when water flows through the shower head and open when water flow stops, thereby bringing the disinfectant material into contact with the residual water to disinfect this residual water. A closeable opening on the external wall of the shower head enables filling and refilling of the disinfectant material.

A further advantage of the valves is that they limit the flow rate of water out of the shower head due to the increased pressure needed to open them thereby reducing water consumption of the shower head. A further advantage of the valves is preventing leakage and dripping of water from the shower head thereby saving water.

According to some embodiments, a shower head for preventing bacteria formation in the shower head comprises: a plurality of outlet nozzles each comprising a valve; wherein each of the valves is adapted to open when pressurized water flows into the shower head and to close when there is no pressurized water inflow such that residual water is held inside the shower head; a disinfectant means in fluid communication with the residual water; and means for preventing fluid communication of the disinfectant means with pressurized water flowing through the shower head.

In some embodiments, the disinfectant means is selected from the group consisting of: ultraviolet light, microfilter, electrolysis, liquid disinfectant material, solid disinfectant material, ozone, bromine, chlorine, hypochlorite and a combination of the above. In some embodiments, the valves are selected from the group consisting of: check valves, backflow valves, duckbill valves, umbrella valves, and a combination of the above. In some embodiments, the disinfectant means comprises a chamber and the chamber comprises: an inner aperture; an inner flap; wherein the flap closes the aperture when pressurized water flows through the head and opens the aperture when there is no pressurized water inflow for placing the disinfectant means in fluid communication with the residual water.

In some embodiments, the chamber further comprises an outer aperture and outer door. In some embodiments, the shower head further comprises: a connecting pipe connected at its distal end to an inlet to the shower head and at its proximal end to a faucet; and an inner pipe positioned within the connecting pipe and connected at its distal end to the disinfectant means and open at its proximal end which is proximal to the faucet; wherein the disinfectant means comprises a pump; wherein the pump, pumps residual water through the disinfectant means, through the inner pipe for circulation through the connecting pipe back into an inner volume of the shower head, for disinfecting the residual water. In some embodiments, the valves prevent air from entering the shower head. In some embodiments, the residual water is continually disinfected.

According to a further embodiment, a shower head for preventing bacteria formation in the shower head, comprises: a plurality of outlet nozzles each comprises a valve; wherein each of the valves is adapted to open when pressurized water flows into the shower head and to close when there is no pressurized water inflow such that residual water is held inside the shower head, and such that air is prevented from entering the shower head. In some embodiments, the valves are selected from the group consisting of: check valves, backflow valves, duckbill valves, umbrella valves, and a combination of the above.

In some embodiments, the shower head further comprises: a disinfectant means in continuous fluid communication with the residual water; and means for preventing fluid communication of the disinfectant means with pressurized water flowing through the shower head.

In some embodiments, the disinfectant means is selected from the group consisting of: ultraviolet light, microfilter, electrolysis, liquid disinfectant material, solid disinfectant material, ozone, bromine, chlorine, hypochlorite and a combination of the above. In some embodiments, the valves prevent or minimize formation of aerosols. In some embodiments, the valves prevent or minimize oxidation of either of the solid or liquid disinfecting material.

According to some embodiments a water-saving shower head comprises: a plurality of outlet nozzles each comprises a valve; wherein the valves are adapted to open when pressurized water flows into the head and close when there is no pressurized water inflow and to reduce the flow rate of pressurized water flowing through the valves. In some embodiments, the valves are selected from the group consisting of: check valves, backflow valves, duckbill valves, umbrella valves, and a combination of the above.

According to some embodiments of the present disclosure, a shower head comprises: a plurality of outlet nozzles each comprising a valve; and a disinfectant means; wherein the valves open when pressurized water flows into the head and close when there is no pressurized water inflow such that residual water is held inside the head by the closed valves for exposure to the disinfectant means. In some embodiments, the valves are check valves. In some embodiments, the valves are duckbill valves. In some embodiments, the valves are umbrella valves.

In some embodiments, the disinfectant means comprises a chamber wherein the chamber comprises: an inner aperture; a door; and a disinfectant material inside the chamber; wherein the door closes the aperture when pressurized water flows through the head and opens the aperture when there is no pressurized water inflow to expose the residual water to the disinfectant material.

In some embodiments, the disinfectant material is selected from the group consisting of: a liquid disinfectant material; and a solid disinfectant material. In some embodiments, the disinfectant material is selected from the group consisting of: ozone; bromine; chlorine; and hypochlorite.

In some embodiments, the chamber further comprises an outer aperture and outer door. In some embodiments, the disinfectant means is selected from the group consisting of: an ultraviolet light, a microfilter, and disinfectant material. Optionally, the shower head further comprises a connecting pipe connected at its distal end to an inlet to the head and at its proximal end to a faucet; and an inner pipe positioned within the connecting pipe and connected at its distal end to the disinfectant means and open at its proximal end which is proximal to the faucet; wherein the disinfectant means comprises a pump; wherein the pump, pumps residual water through the disinfectant means, through the inner pipe for circulation through the connecting pipe back into an inner volume of the head, for disinfecting the water. In some embodiments, the valves prevent air from entering the shower head while allowing outflow of pressurized water.

According to further embodiments of the present disclosure, a shower head comprises: a plurality of outlet nozzles each comprising a valve; wherein each of the valves open when pressurized water flows into the head and close when there is no pressurized water inflow such that residual water is held inside the head; a disinfectant means in fluid communication with the residual water; and means for preventing fluid communication of the disinfectant means with the pressurized water. In some embodiments, the disinfectant means is selected from the group consisting of: ultraviolet light; microfilter; liquid disinfectant material; solid disinfectant material; ozone; bromine; chlorine; hypochlorite; and a combination of the above.

In some embodiments, each of the valves are selected from the group consisting of: check valves; backflow valves; duckbill valves; umbrella valves; and a combination of the above. Optionally, the shower head comprises a connecting pipe connected at its distal end to an inlet to the head and at its proximal end to a faucet; and an inner pipe positioned within the connecting pipe and connected at its distal end to the disinfectant means and open at its proximal end which is proximal to the faucet; wherein the disinfectant means comprises a pump; wherein the pump, pumps residual water through the disinfectant means, through the inner pipe for circulation through the connecting pipe back into an inner volume of the head, for disinfecting the residual water. In some embodiments, the valves prevent air from entering the shower head while allowing outflow of pressurized water.

According to further embodiments of the present disclosure, a shower head comprises: a plurality of outlet nozzles each comprising a valve; and a disinfectant module; wherein the valves open when pressurized water flows into the head and close when there is no pressurized water inflow such that residual water is held inside the head by the closed valves for exposure to the disinfectant module. In some embodiments, the disinfectant module comprises at least one of: ultraviolet light; microfilter; liquid disinfectant material; solid disinfectant material; ozone; bromine; chlorine; or hypochlorite.

In some embodiments, each of the valves are selected from the group consisting of: check valves; backflow valves; duckbill valves; umbrella valves; and a combination of the above. In some embodiments, the module comprises an outer aperture and outer door. Optionally, the shower head further comprises a connecting pipe connected at its distal end to an inlet to the head and at its proximal end to a faucet; and an inner pipe positioned within the connecting pipe and connected at its distal end to the disinfectant module and open at its proximal end which is proximal to the faucet; wherein the disinfectant module comprises a pump; wherein the pump, pumps residual water through the disinfectant module, through the inner pipe for circulation through the connecting pipe back into an inner volume of the head, for disinfecting the water. In some embodiments, the valves prevent air from entering the shower head while allowing outflow of pressurized water.

The term shower head or head as used herein may refer to any outlet of a water distribution system including a spout, faucet, or tap. The shower head as described herein is attached to a pipe or other form of attachment that connects it to a water source as known in the art. While embodiments disclosed herein depict a spherical shower head, this should not be considered limiting and the disclosure may comprise any shape or dimension of faucet or shower head.

The flow of water into the shower head assumes an attached water source providing water under pressure to generate a flow of water. Similarly the water source may be stopped or closed, halting the supply of pressurized water and the flow into the head. Pressurized water as defined herein is of a pressure found in common residential and commercial water supply systems and may vary between 30-150 PSI.

Implementation of the method and system of the present disclosure involves performing or completing certain selected tasks or steps manually, automatically, or a combination thereof.

Unless otherwise defined, all technical and scientific terms used herein have the same meaning as commonly understood by one of ordinary skill in the art to which this disclosure belongs. The materials, methods, and examples provided herein are illustrative only and not intended to be limiting.

BRIEF DESCRIPTION OF THE DRAWINGS

The disclosure is herein described, by way of example only, with reference to the accompanying drawings. With specific reference now to the drawings in detail, it is stressed that the particulars shown are by way of example and for purposes of illustrative discussion of the preferred embodiments of the present disclosure only, and are presented in order to provide what is believed to be the most useful and readily understood description of the principles and conceptual aspects of the disclosure. In this regard, no attempt is made to show structural details of the disclosure in more detail than is necessary for a fundamental understanding of the disclosure, the description taken with the drawings making apparent to those skilled in the art how the several forms of the disclosure may be embodied in practice.

In the drawings.

DETAILED DESCRIPTION

The present disclosure, in at least some embodiments, is of a shower head that uses check valves to contain residual water within the shower head, and prevent air entry, creation of water aerosols, and formation of limescale to prevent an environment conducive to bacteria formation. The shower head also provides for disinfection of the residual water that remains inside the shower head when there is no water flow. The check valves also reduce the flow rate of water out of the head and prevent water leakage for saving of water.

Figure 1A:
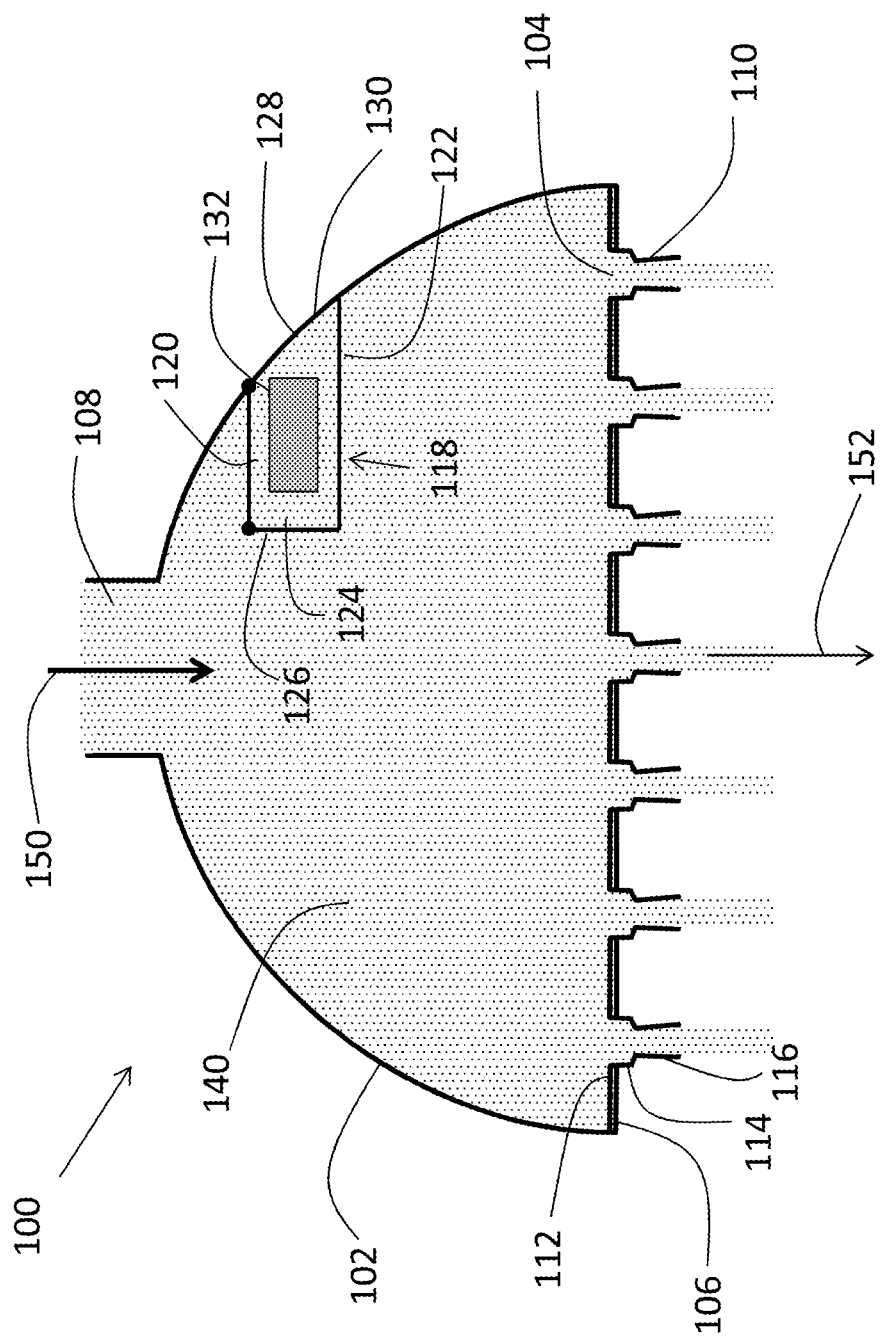
FIGS. 1A and 1B are exemplary illustrations of a shower head comprising a plurality of duckbill valves and disinfectant means according to at least some embodiments of the present disclosure.
Figure 1B:
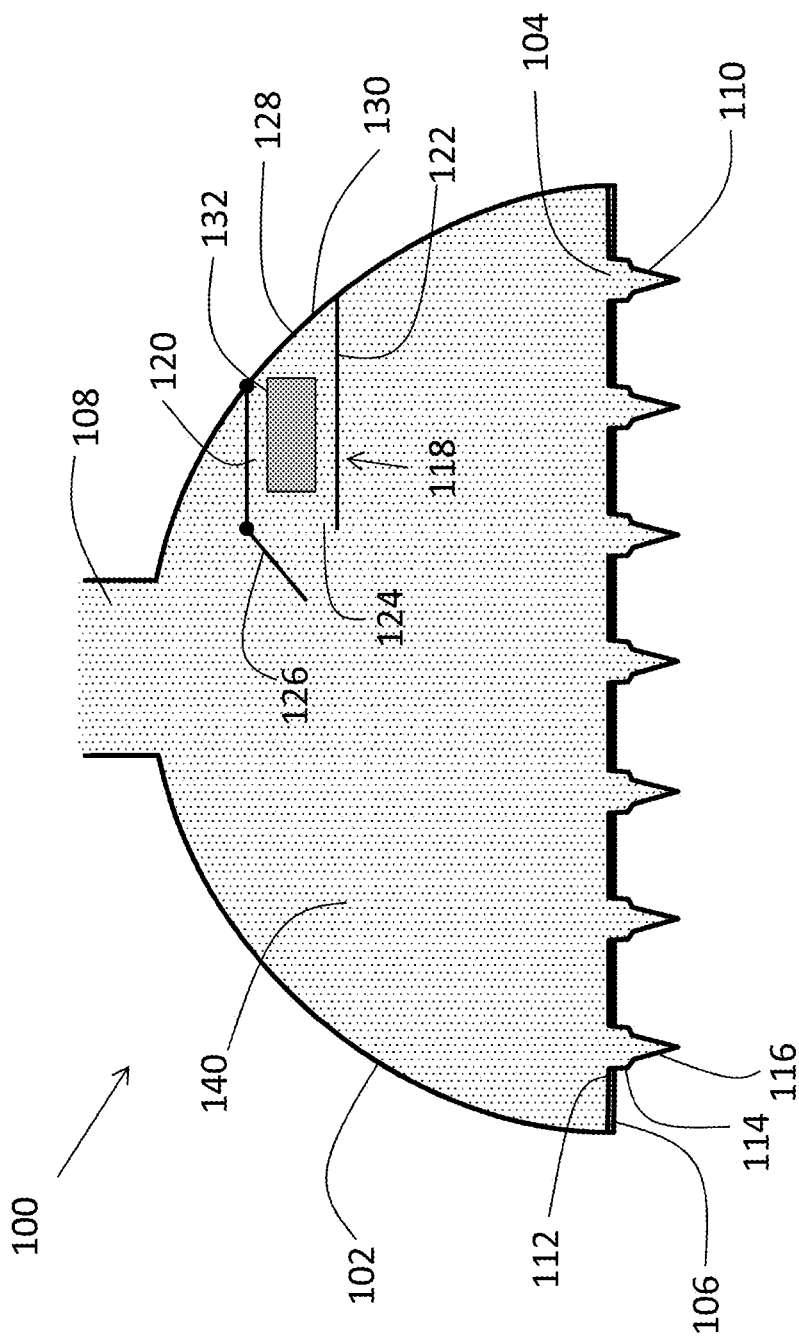

Reference is now made to FIGS. 1A-1B which are exemplary illustrations of a shower head according to at least some embodiments of the present disclosure. As shown, the shower head 100 comprises a body 102. Body 102 comprises any material common in shower head manufacture such as the non-limiting examples of plastic, stainless steel, or a combination of these or other materials. Body 102 is shown as having a cylindrical form, but this should not be considered limiting. Body 102 could be of any shape suitable for a shower head or faucet as known in the art.

Body 102 comprises a plurality of outlets 104 in base 106. Although the cutaway of FIGS. 1A-1B shows seven outlets 104, this should not be considered limiting. Shower 100 In some embodiments, comprises as many outlets 104 arranged in any arrangement to suit any current shower head outlet pattern as known in the art. Body 102 further comprises an inlet 108 which is connected via a pipe or connector (not shown) to a source of pressurized water.

Outlets 104 comprise valves 110. Valve 110 may optionally be any type of valve, such as a check valve, that allows flow of pressurized water out of head 100 via outlet 104 by the pressurized water forcing the valve to open. Valve 110 is adapted to prevent air from entering head 100 by closing when pressurized water ceases flowing into shower head 100 and only opening to allow pressurized water out of valves 110. Valve 110 is adapted to prevent formation of water aerosols by closing when pressurized water ceases flowing into shower head 100 and only opening to allow pressurized water out of valves 110 to prevent inflow of air for forming aerosols. Valves 110 is adapted to prevent formation of limescale in shower head 100 by retaining residual water inside shower head 100 thereby preventing drying out of the shower head that results in limescale formation. In some embodiments, valve 110 is any check valve or backflow valve. In some embodiments, valve 110 is a duckbill valve formed from an elastomeric material. Valve 110 comprises flange 112 which is sealably attached to head base 106. Valve saddle 114 extends through outlet 104 and terminates in duckbill 116. Duckbill 116 is forced open by pressurized water and closes to a closed state in the absence of pressurized water due to the elastomeric properties of the material from which duckbill 116 is formed. Optionally, any combination of valve types may be used.

Shower head 100 comprises disinfectant means 118. Disinfectant means 118 may also be referred to herein as disinfectant unit 118 or disinfectant module 118. Disinfectant means 118 comprises one or more of a disinfectant material, ultraviolet (UV) light, microfilter and/or electrolysis system. Disinfectant means 118 is provided so as to be active in the residual water when water flow ceases and not active when water flows through the shower head.

In the embodiment of FIGS. 1A, 1B, 2A and 2B, disinfectant means 118 comprises chamber 120. Chamber 120 comprises chamber body 122 which encloses chamber 120. Chamber body has an inner aperture 124 sealed by inner flap 126. When flap 126 is open, volume 140 is fluidly connected to chamber 120 via aperture 124. Inner flap 126 is attached to chamber body such that pressurized water flowing through head 100 will force flap 126 to close, whereas the absence of a pressurized water flow will result in flap 126 opening to thereby expose volume 140 to disinfectant means 118.

Chamber body 122 also comprises external aperture 128 which is sealably closed with outer door 130. Outer door 130 is formed such that it can be opened or closed to allow filling or refilling of disinfectant material 132 which is placed inside chamber 120. Non-limiting examples of disinfectant material 132 include Ozone (O3), bromine, chlorine and hypochlorite. In some embodiments, disinfectant material 132 is provided in a solid or liquid form. In some embodiments, disinfectant material 132 is provided in a form that allows disinfection to be provided for an extended period of time before disinfectant material 132 needs to be replaced. In some embodiments, disinfectant material 132 is active for 1 to 12 months before needing replacement. The concentration of chlorine disinfectant within residual water is in some embodiments, between 0.8 ppm and 3 ppm. In some embodiments, a combination of disinfectant means 118 are used. As a non-limiting example, chlorine tablets may be combined with a UV light.

Chamber 120 is mounted in shower head 100 such that inner aperture 124 is in fluid communication with inner volume 140 while outer aperture 128 is accessible from outside of head 100 to allow access to chamber 120 for replacement of disinfectant material 132 and/or maintenance or recharging of disinfectant means 118.

It should be appreciated that the valves 110 in shower 100 prevent or minimize formation of bacteria through the combined: prevention of air entry, creating residual water, prevention of turbulence and aerosols, prevention of water/air mixture, and prevention of limescale. In some embodiments, shower head 100 is therefore provided without disinfectant means 118.

In operation, as shown in FIG. 1A, pressurized water flows into head 100 through inlet 108 in the direction as shown by arrow 150. The pressurized water fills volume 140 and the pressurized water pressing on valves 110 forces duckbills 116 of valves 110 to open such that water flows out of head 100 via outlets 104 in the direction as indicated by arrow 152. The presence of pressurized water flowing through head 100 forces flap 126 into a closed position such that the water in volume 140 is not in communication with chamber 120.

As shown in FIG. 1B, when the pressurized water is shut off, such as by a tap (not shown) upstream from head 100, water ceases to flow into head 100. Duckbills 116 of valves 110 close and water is held in volume 140 to form residual water. The residual water can now be exposed to disinfectant to prevent the growth of bacteria. Additionally, air cannot enter outlets 110 and therefore no air/water mixture is provided, and bacterial growth is retarded. The lack of pressurized water results in flap 126 opening such that volume 140 and chamber 120 are in fluid communication. Disinfectant material 132 mixes into the water in volume 140 to kill pathogens that may be in the water. Aperture 124 may be adapted to be larger or smaller to allow greater or lesser mixing of water with disinfectant material 132. Aperture 124 is in some embodiments, adjustable to adjust the concertation of disinfectant material 132 in residual water within volume 140. Optionally adjustment is provided by an adjustment lever (not shown) placed next to door 130.

When the pressurized water flow is renewed, as shown in FIG. 1A, water again flows into head 100 through inlet 108 in the direction as shown by arrow 150. The water already in volume 140 is added to the pressurized flow which forces duckbills 116 of valves 110 to open such that water flows out of head 100 via outlets 104 in the direction as indicated by arrow 152. The presence of water in volume 140 and the opening of duckbills only when pressurized water is present prevents creation of air bubbles or water aerosol inside volume 140 preventing formation of an environment conducive to bacteria growth. The presence of pressurized water flowing through head 100 again forces flap 126 into a closed position such that the water in volume 140 is not in communication with chamber 120 and disinfectant material 132 is not released (and wasted) into the flowing water.

Figure 2A:
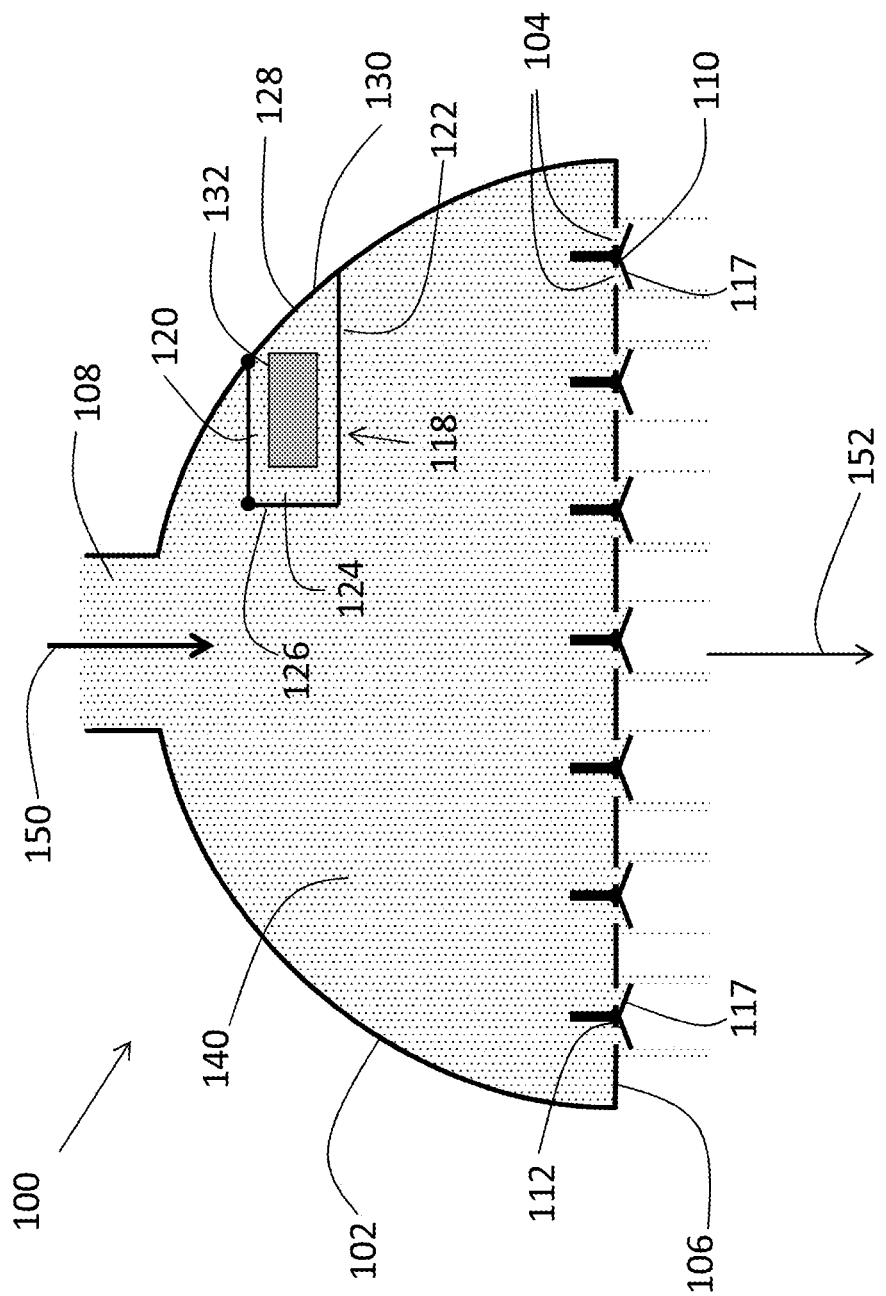
FIGS. 2A and 2B are exemplary illustrations of a shower head comprising a plurality of umbrella valves and disinfectant means according to at least some embodiments of the present disclosure.
Figure 2B:
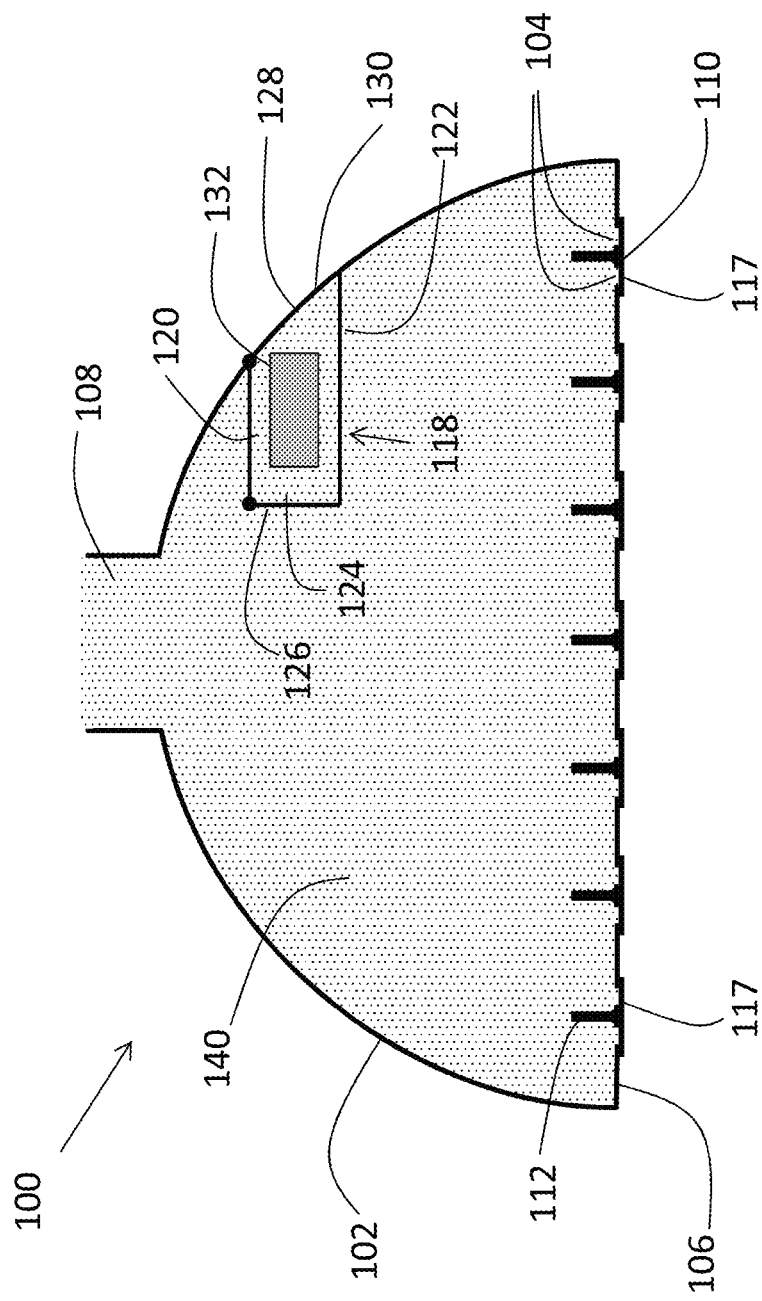

Reference is now made to FIGS. 2A-2B which are exemplary illustrations of a shower head according to at least some embodiments of the present disclosure. The embodiment of FIGS. 2A and 2B is identical to that of FIGS. 1A and 1B with the exception of valves 110. As shown in FIGS. 2A and 2B, the valves used are umbrella valves. Valve 110 is formed from an elastomeric material. Valve 110 comprises flange 112 which is sealably attached to head base 106. Umbrella 117 alternatively allow flow of pressurized water out of head 100 via outlet 104 as shown in FIG. 2A or seals outlets 104 when no pressurized water flows into head 100. Valves 110 of FIGS. 2A and 2B therefore provide the same result as those in FIGS. 1A and 1B, holding residual water within volume 140 so that residual water can be disinfected by disinfectant means 118 as described above.

Figure 3A:
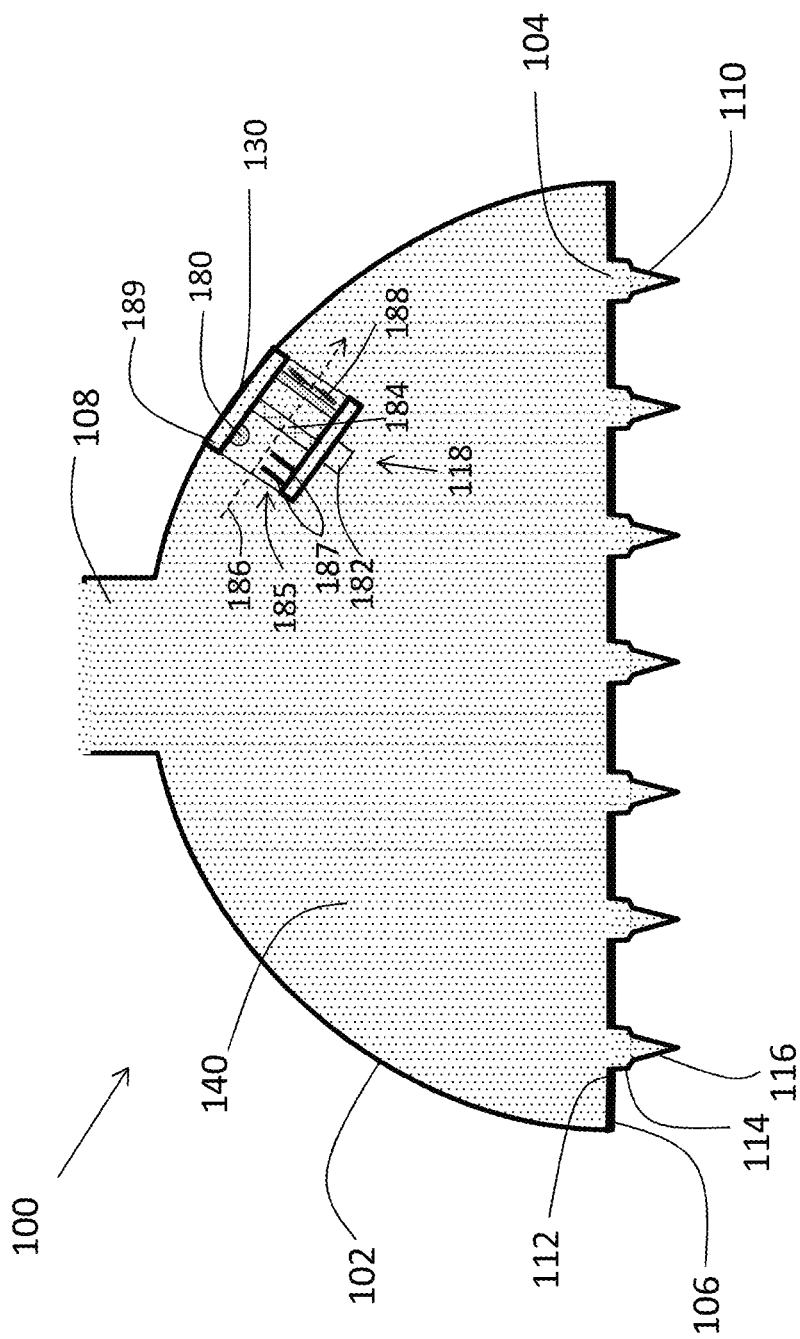
FIGS. 3A and 3B are exemplary illustrations of a shower head comprising alternative disinfectant means according to at least some embodiments of the present disclosure.
Figure 3B:
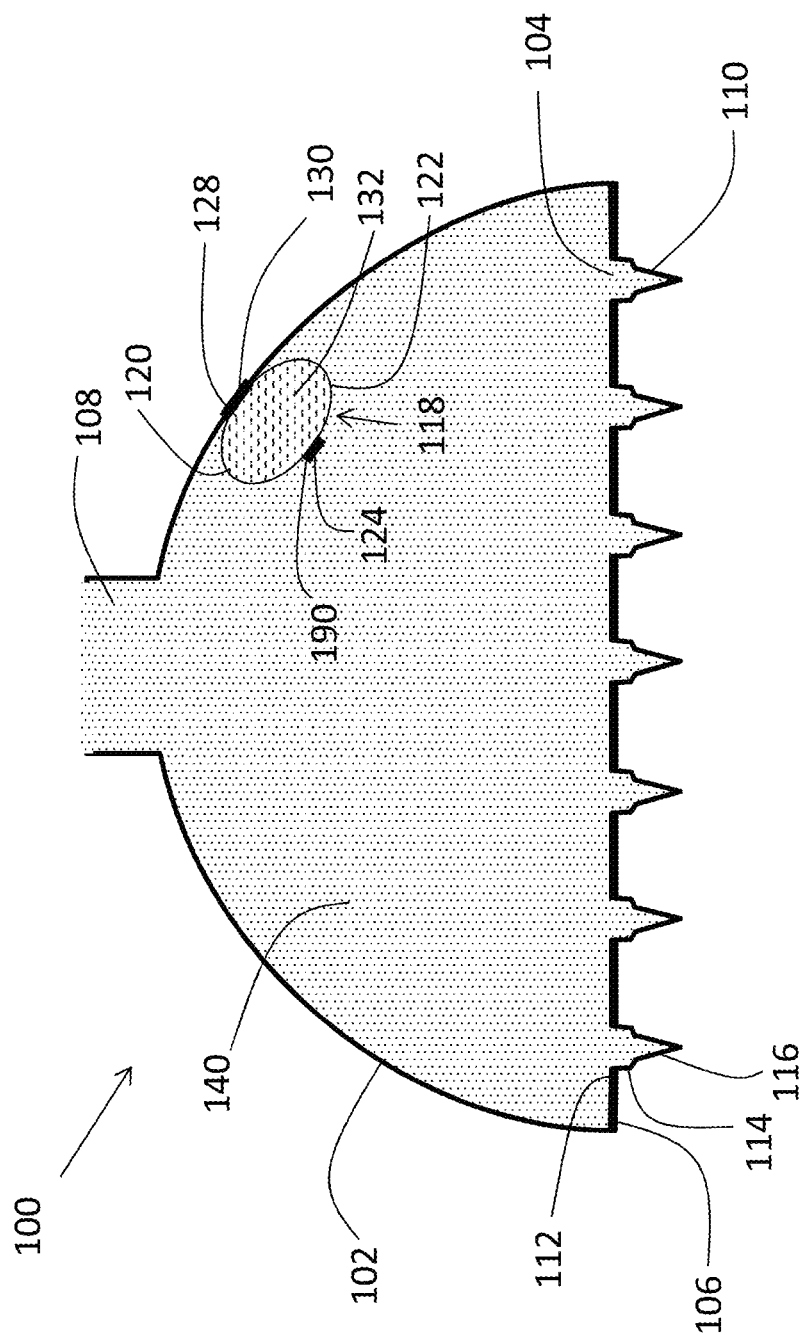

Reference is now made to FIGS. 3A-3B which are exemplary illustrations of a shower head according to at least some embodiments of the present disclosure. FIGS. 3A and 3B illustrate the shower head of FIG. 1A, but with an alternative embodiment of disinfectant means 118.

As shown in in FIG. 3A, disinfectant means 118 comprises ultraviolet (UV) light 180, microfilter 184, electrolysis system 185, pump 188, and flow detector 182. UV light 180 and pump 188 comprise a power source 189. Electrolysis system 185 comprises electrodes 187 (at least one cathode and one anode) with a DC voltage source applied from power source 189 between the electrodes, leading to the electrolysis of the residual water from volume 140. The components of FIG. 3A are shown in an illustrative form and may be larger or smaller in practice.

When flow detector 182 detects a flow of pressurized water in volume 140, UV light 180, electrolysis system 185 and pump 188 are turned off to conserve power. When flow detector 182 detects that no flow is present, such as when water is not flowing through head 100, pump 188 is activated to draw water through disinfectant means 118 in the direction shown by arrow 186. When no flow is present UV light 180 is also activated. Pump 188 therefore draws water from volume 140 through disinfectant means 118 to pass UV light 180, electrolysis system 185, and microfilter 184 to thereby disinfect the residual water inside volume 140. The power source 189 such as a battery may be replaced or charged via outer door 130. Additionally microfilter 184 may be cleaned or replaced via outer door 130. Optionally the embodiment shown in FIG. 3A comprises flow detector 182, pump 188 and only one of UV light 180, microfilter 184, or electrolysis system 185. Optionally, components 180, 184, and 185 are mounted directly on the inner surface of shower head body 102.

As shown in FIG. 3B, disinfectant means 118 comprises chamber 120 which comprises chamber body 122 which encloses chamber 120. Chamber body has an inner aperture 124 sealed by inner door or nozzle 190. When nozzle 190 is open, volume 140 is fluidly connected to chamber 120 via aperture 124. Inner nozzle 190 is adapted such that pressurized water flowing through head 100 will force nozzle 190 to close, whereas the absence of a pressurized water flow will result in nozzle 190 opening.

Chamber body 122 also comprises external aperture 128 which is sealably closed with outer door 130. Outer door is formed such that it can be opened or closed to allow filling or refilling of liquid disinfectant material 132 which is placed inside chamber 120. Liquid disinfectant material 132 is provided in a form that allows disinfection to be provided for an extended period of time before disinfectant material 132 needs to be replaced. Disinfectant material 132 is in some embodiments, active for 1 to 12 months before needing replacement.

Chamber 120 is mounted in shower head 100 such that inner aperture 124 is in fluid communication with inner volume 140 while outer aperture 128 is accessible from outside of head 100 to allow access to chamber 120 for replacement of disinfectant material 132.

Figure 4:
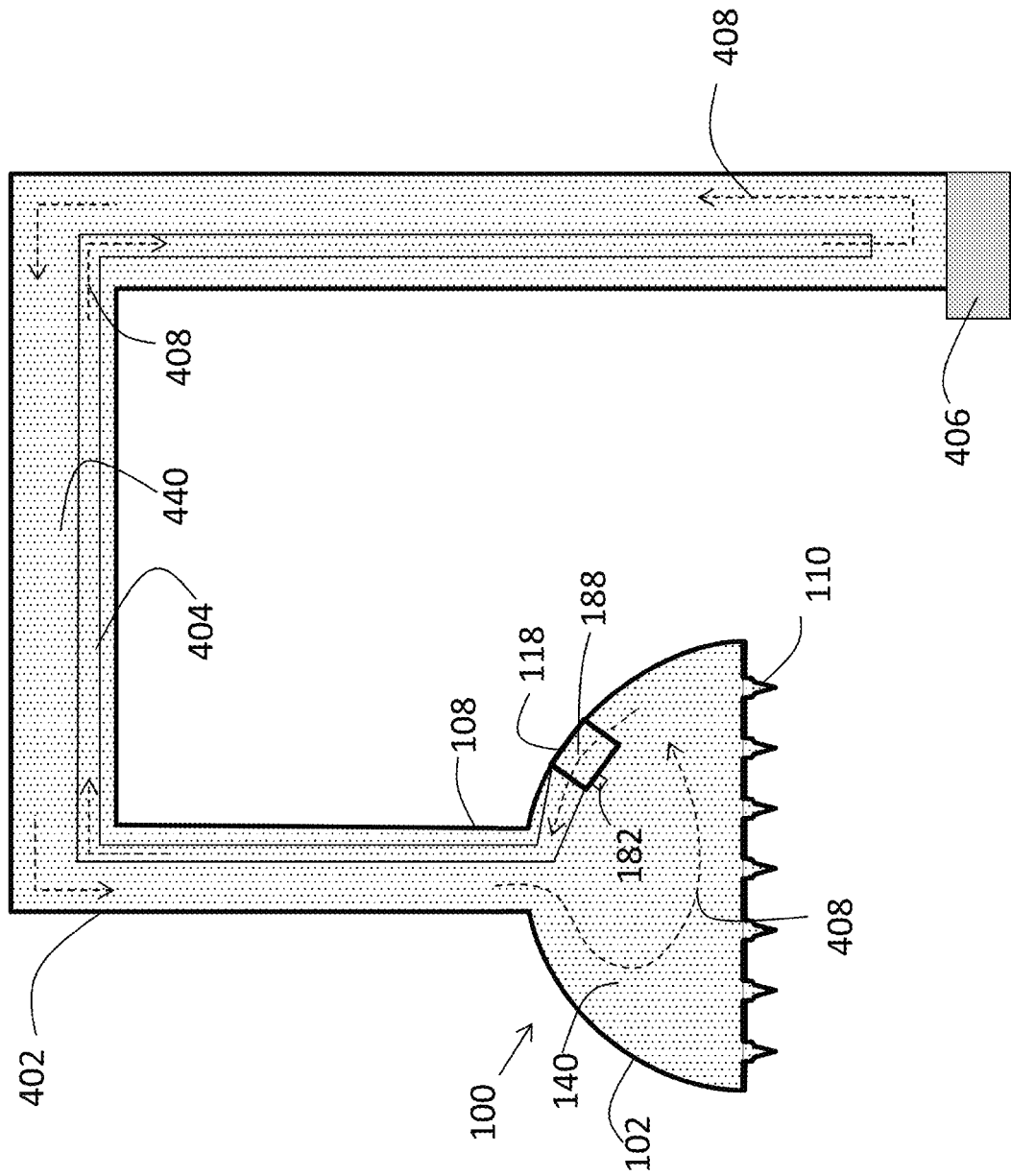
FIG. 4 is an exemplary illustration of a shower head with disinfectant means for an attached pipe according to at least some embodiments of the present disclosure.

Reference is now made to FIG. 4 which is exemplary illustrations of a shower head according to at least some embodiments of the present disclosure. FIG. 4 illustrates the shower head of any of the previous embodiments, but with an extension pipe to disinfect the pipe 402 connected to head 100.

As shown in in FIG. 4, pipe 402 is connected at its distal end to head inlet 108. Pipe 402 is connected at its proximal end to faucet 406. Inner pipe 404 is connected at its distal end to disinfectant means 118. The proximal end of inner pipe 404 is open and in fluid communication with the water inside pipe 402.

Disinfectant means 118 comprises a pump 188, and flow detector 182. Disinfectant means 118 also comprises any of the disinfectant mechanisms such as disinfectant material, UV light, electrolysis system or microfilter as described in the embodiments presented above. Pump 188 comprises a power source (not shown). When flow detector 182 detects a flow of water in volume 140, pump 188 is turned off to conserve power. When flow detector 182 detects that no flow is present, such as when water is not flowing through head 100, pump 188 is activated to draw water through disinfectant means 118 in the direction shown by arrows 408.

When faucet 406 is closed and water flow through head 100 is ceased, valves 110 will close as described above, creating residual water in volume 140. Residual water will extend and also remain in volume 440 within pipe 402. Driven by pump 188, water will therefore circulate as shown by arrows 408, through disinfectant means 118, through inner pipe 404, out of the proximal end of pipe 404, and returning through pipe 402 into volume 140. Therefore all of residual water in volumes 140, 440 and inside inner pipe 404 will be disinfected.

Reference is now made to FIGS. 5A-5E which are exemplary illustrations of a shower head according to at least some embodiments of the present disclosure. The embodiment of FIGS. 5A-5E comprises the same components as that of FIGS. 1A and 1B.

Figure 5A:
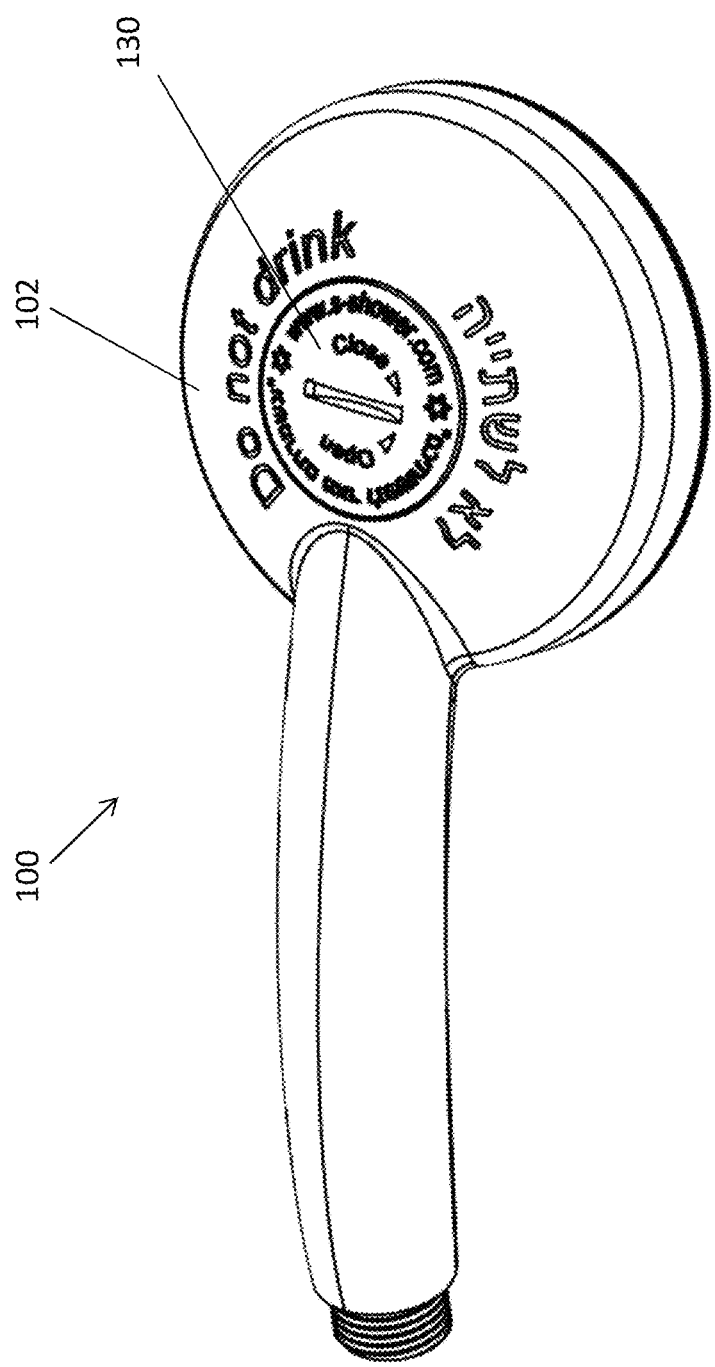
FIGS. 5A-5E are exemplary illustrations of a shower head comprising a plurality of check valves and disinfectant means according to at least some embodiments of the present disclosure.
Figure 5B:
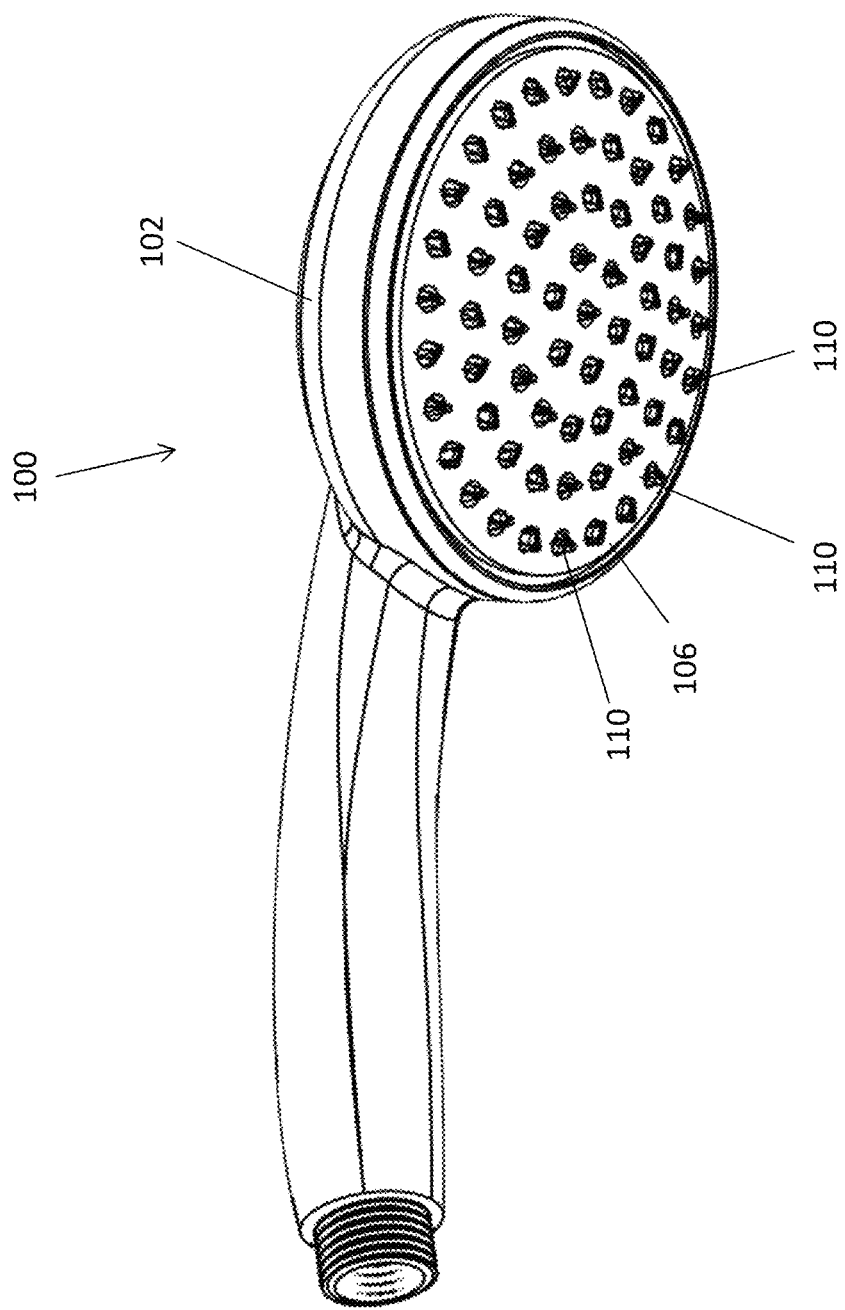
Figure 5C:
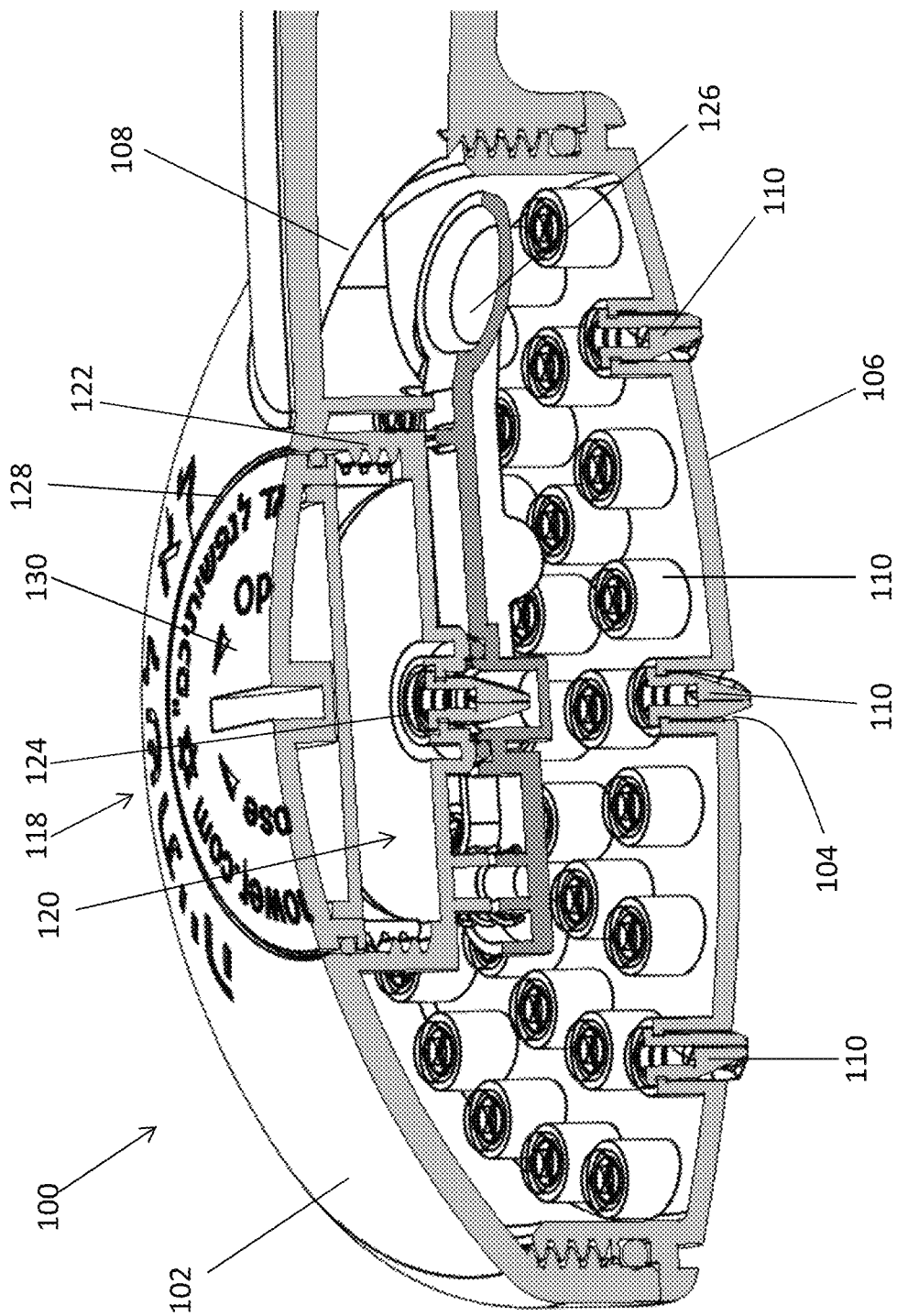

As shown, the shower head 100 comprises a body 102. Body 102 comprises a plurality of outlets 104 in base 106. Body 102 further comprises an inlet 108 which is connected via a pipe or connector (not shown) to a source of pressurized water. Outlets 104 comprise valves 110. Valve 110 may optionally be any type of valve, such as a check valve, that allows flow of pressurized water out of head 100 via outlet 104. As shown in FIG. 5C valve 110 is a duckbill valve formed from an elastomeric material. Optionally, any valve type may be used.

Shower head 100 comprises disinfectant means 118. Disinfectant means 118 is provided so as to be active in the residual water when water flow ceases and not active when water flows through the shower head. In the embodiment of FIGS. 5A-5E, disinfectant means 118 comprises chamber 120. Chamber 120 comprises chamber body 122 which encloses chamber 120. Chamber body has an inner aperture 124 sealed by inner flap 126. When flap 126 is open, volume 140 is fluidly connected to chamber 120 via aperture 124.

Figure 5D:
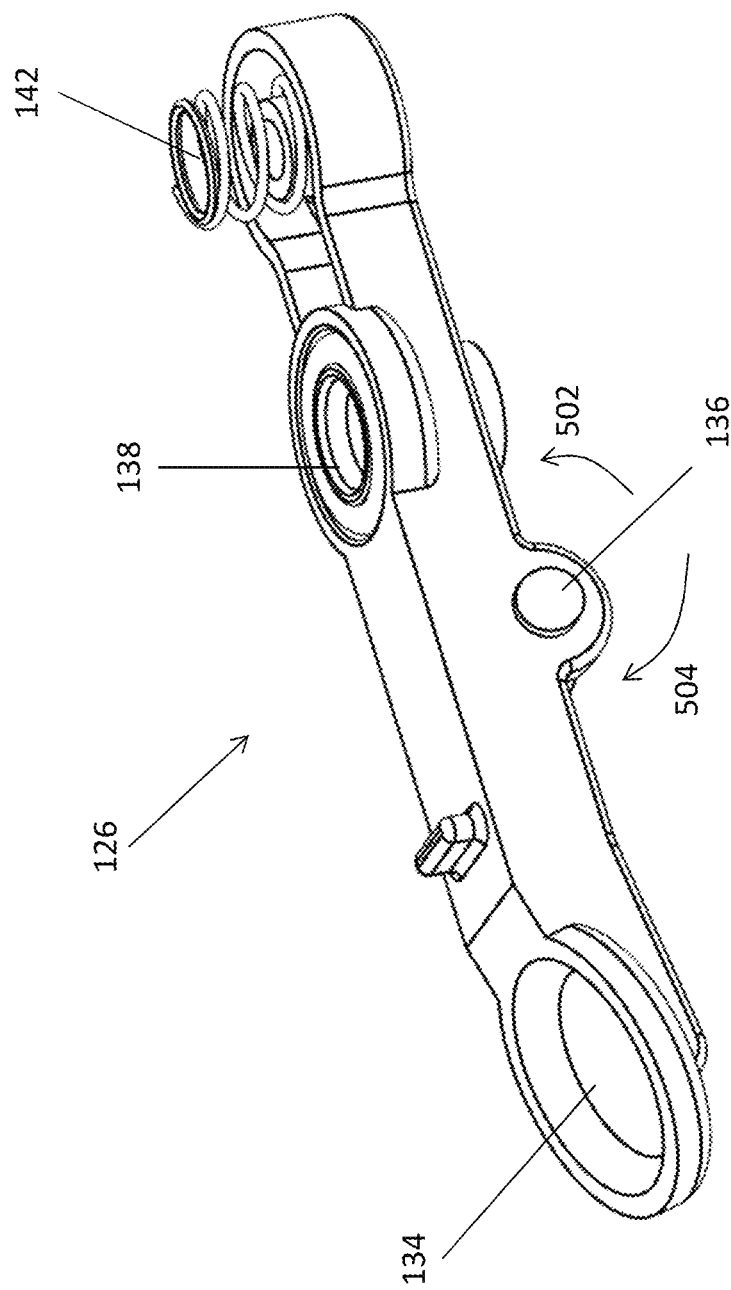
Figure 5E:
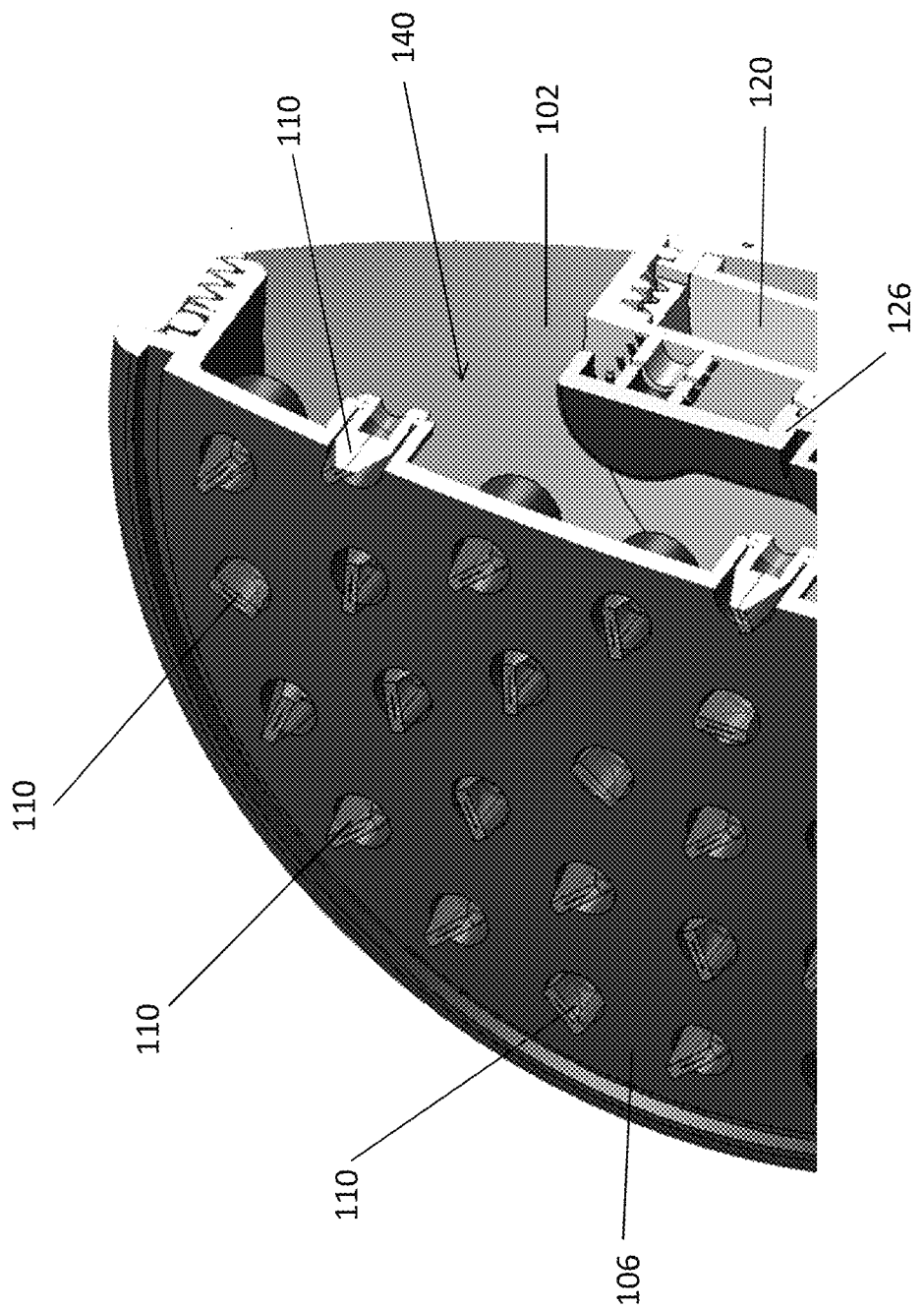

Inner flap 126 is attached to chamber body such that pressurized water flowing through head 100 will force flap 126 to close, whereas the absence of a pressurized water flow will result in flap 126 opening to thereby expose volume 140 to disinfectant means 118. As shown in FIGS. 5C and 5D, flap 126 comprises push bowl 134, swivel 136, seal 138 and spring 142. When pressurized water flows into shower head 100, the pressurized water pushes on push bowl 134 such that inner flap 126 tilts about swivel 136 in a direction 502 to force seal 138 against inner aperture 124 and prevent fluid communication between chamber 120 and inner volume 140. When pressurized water flow stops, spring 142 pushes flap 126 down such that flap tilts about swivel 136 in a direction 504 such that seal 138 moves away from inner aperture 124 and fluid communication is enabled between chamber 120 and inner volume 140.

Chamber body 122 also comprises external aperture 128 which is sealably closed with outer door 130. Outer door 130 is formed such that it can be opened or closed to allow filling or refilling of disinfectant material (not shown) which is placed inside chamber 120. Chamber 120 is mounted in shower head 100 such that inner aperture 124 is in fluid communication with inner volume 140 while outer aperture 128 is accessible from outside of head 100 to allow access to chamber 120 for replacement of disinfectant material 132 and/or maintenance of disinfectant means 118.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

Therefore combinations of the embodiments of FIGS. 1A, 1B, 2A, 2B, 3A and 3B are possible. As a non-limiting example, the valve of FIG. 2A may be combined with the chamber of FIG. 3B. Optionally other such combinations are possible.

While the disclosure has been described with respect to a limited number of embodiments, it will be appreciated that many variations, modifications and other applications of the disclosure may be made.

What is claimed is:

1. A shower head for preventing bacteria formation in the shower head, comprising:
   a plurality of outlet nozzles each comprising a valve, wherein each of the valves is adapted to open when pressurized water flows into the shower head and to close when there is no pressurized water inflow such that residual water is held inside the shower head; and
   a disinfectant in communication with the residual water, wherein the shower head is configured to prevent communication of the disinfectant with pressurized water flowing through the shower head.

2. The shower head of claim 1, wherein the disinfectant is at least one of ultraviolet light.

3. The shower head of claim 2, wherein the shower head is configured to prevent communication of the disinfectant with pressurized water by turning off the disinfectant when pressurized water flows through the shower head.

4. The shower head of claim 3 further comprising a flow detector.

5. The shower head of claim 4 further comprising a pump configured to draw residual water through the disinfectant.

6. The shower head of claim 1, wherein any of the valves is one of a check valve, a backflow valve, a duckbill valve, and an umbrella valve.

7. The shower head of claim 6, wherein the valves prevent air from entering the shower head.

8. The shower head of claim 1, wherein the shower head is configured to prevent communication of the disinfectant with pressurized water by including a chamber for placing the disinfectant therein and wherein the chamber includes an inner aperture and an inner flap, wherein the flap closes the aperture when pressurized water flows through the head and opens the aperture when there is no pressurized water inflow for placing the disinfectant in fluid communication with the residual water.

9. The shower head of claim 8, wherein the chamber further comprises an outer aperture and outer door.

10. The shower head of claim 1, further comprising:
    a connecting pipe connected at its distal end to an inlet to the shower head and at its proximal end to a faucet;
    an inner pipe positioned within the connecting pipe and connected at its distal end to the disinfectant means and open at its proximal end which is proximal to the faucet; and
    a pump,
    wherein the pump pumps residual water through the disinfectant, through the inner pipe for circulation through the connecting pipe back into an inner volume of the shower head, for disinfecting the residual water.

11. The shower head of claim 1, wherein the residual water is continually disinfected.

12. The shower head of claim 1, wherein the valves prevent or minimize formation of aerosols.

13. The shower head of claim 1, wherein the shower head is configured to prevent communication of the disinfectant with pressurized water by including a chamber for placing the disinfectant therein, wherein the chamber includes a nozzle, wherein the nozzle closes the chamber when pressurized water flows through the head and opens the chamber when there is no pressurized water inflow for placing the disinfectant in communication with the residual water.

14. The shower head of claim 1, wherein the disinfectant is at least one of liquid disinfectant material or solid disinfectant material.

15. The shower head of claim 14, wherein the valves prevent or minimize oxidation of either of the solid or liquid disinfecting material.

16. The shower head of claim 1, wherein the disinfectant is at least one of ozone, bromine, chlorine, or hypochlorite.

17. The shower head of claim 1, wherein the disinfectant is a microfilter.

18. The shower head of claim 1, wherein the disinfectant is electrolysis.

* * * * *